US008347431B1

(12) United States Patent
Cohron, III

(10) Patent No.: US 8,347,431 B1
(45) Date of Patent: Jan. 8, 2013

(54) APPARATUS AND METHOD FOR A PILLOW HOLDER

(76) Inventor: William N. Cohron, III, Mobile, AL (US)

( * ) Notice: Subject to any disclaimer, the term of this patent is extended or adjusted under 35 U.S.C. 154(b) by 0 days.

(21) Appl. No.: 12/931,034

(22) Filed: Jan. 24, 2011

Related U.S. Application Data

(63) Continuation-in-part of application No. 12/151,631, filed on May 8, 2008, now abandoned.

(51) Int. Cl.

| | |
|---|---|
| ***A47G 9/02*** | (2006.01) |
| *A47C 21/02* | (2006.01) |
| *A47C 21/00* | (2006.01) |
| *A47C 1/10* | (2006.01) |
| *A47C 7/36* | (2006.01) |
| *A47G 9/00* | (2006.01) |
| *A61G 15/00* | (2006.01) |
| *B60R 22/28* | (2006.01) |

(52) U.S. Cl. ............. 5/490; 5/489; 5/491; 5/923; 5/498; 5/485; 297/397

(58) Field of Classification Search .............. 5/490, 923, 5/482, 922, 504.1, 496, 498, 485; 297/397
See application file for complete search history.

(56) References Cited

U.S. PATENT DOCUMENTS

| | | | | |
|---|---|---|---|---|
| 3,346,892 | A | 10/1967 | DuPriest | |
| 3,506,988 | A | 4/1970 | Saddoris | |
| 4,231,125 | A | 11/1980 | Tittl | |
| 4,662,016 | A | 5/1987 | Seeman | |
| 5,441,789 | A | 8/1995 | Walker | |
| 5,567,015 | A | 10/1996 | Arias | |
| D387,939 | S | 12/1997 | Tedesco et al. | |
| D450,970 | S | 11/2001 | Self | |
| 6,438,805 | B1 | 8/2002 | Goss et al. | |
| 6,666,426 | B1 | 12/2003 | Taylor | |
| 2005/0206208 | A1 | 9/2005 | Deering | |
| 2008/0164734 | A1 * | 7/2008 | Nile et al. | ................ 297/230.13 |

* cited by examiner

*Primary Examiner* — Jonathan Liu
(74) *Attorney, Agent, or Firm* — George L Williamson

(57) ABSTRACT

Apparatus and method for holding a pillow on an upwardly extending end of a mattress having a single sheet of material having a upper end and a lower end along with a first side and a second side having an upper surface and a lower surface. The lower end is folded back upon itself to form an enclosure so that the upper surfaces of the folded section are adjacent to each other having a pillow disposed in the enclosure. The upper end is wrapped around the upwardly extended end of the mattress, using straps to hold the upper end in place.

5 Claims, 3 Drawing Sheets

APPARATUS AND METHOD FOR A PILLOW HOLDER

RELATED APPLICATIONS

This application is a Continuation-in-Part of U.S. patent application Ser. No. 12/151,631 filed on May 8, 2008 now abandoned.

BACKGROUND OF THE INVENTION

1. Field of the Invention

The present invention relates generally to bedding materials and, more particularly, is concerned with a pillow holder.

2. Description of the Prior Art

Pillow holders have been described in the prior art. However, none of the prior art devices disclose the unique features of the present invention.

In U.S. Pat. No. 3,346,892 to Du Priest dated Oct. 17, 1967 a pillow supported on a bed by two straps forming a first loop in and around the pillow and the second loop extending in and around a portion the bed is disclosed. In U.S. Pat. No. 3,506,988 to Saddoris dated Apr. 21, 1970, a U-shaped spring clamp made of plastic and to the upper surface of which is intricately formed a pressure-type of clamp having a serrated jaw adapted to firmly hold a pillow is disclosed. In U.S. Pat. No. 4,662,016 to Seeman dated May 5, 1987, a bedclothes retaining system provided for holding in position bedclothes such as sheets, blankets and other covers on the bed is disclosed. In U.S. Pat. No. 6,438,805 to Goss, et al. dated Aug. 27, 2002, a pillow-securing device for releasably holding a pillow in position on an elevated surface involving a plurality of straps is disclosed. In U.S. Pat. No. 6,666,426 to Taylor dated Dec. 23, 2003, a pillow-holding mechanism for use on an adjustable service bed provides a holding mechanism to prevent a pillow from falling down or shifting to an uncomfortable position when the adjustable surface is raised and/or lowered.

While these pillow holders may be suitable for the purposes for which they were designed, they would not be as suitable for the purposes of the present invention, as hereinafter described.

SUMMARY OF THE PRESENT INVENTION

Apparatus and method for a pillow holder comprising a piece of material having mating edges which forms an enclosure within which a pillow can be removably inserted. The piece of material has straps attached about its upper end for placement around the upper end of the mattress of an adjustable bed so that the pillow is secured in a position on the upper end of the mattress on the bed when the head of the bed is in a raised position.

An object of the present invention is to provide a pillow holder designed for adjustable beds which keeps the pillow from slipping down from the head of the bed when the head of the bed is raised. A further object of the present invention is to provide a pillow holder which can be easily and simply cleaned and maintained in a sterile condition suitable for use in a hospital environment.

A further object of the present invention is to provide a pillow holder which can be easily and relatively inexpensively manufactured of existing materials.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
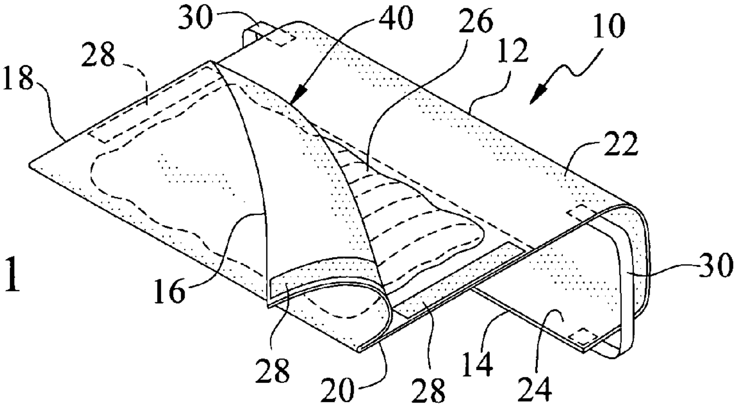
FIG. 1 is a perspective view of one embodiment of the present invention in operative connection with a pillow.

With regard to reference numerals used, the following numbering is used throughout the drawings.

10 present invention
12 piece of material
14 upper end
16 lower end
18 first side
20 second side
22 upper surface
24 lower surface
26 pillow
28 hook and loop material
30 strap
32 hook and loop material
34 hook and loop material
35 upper end
36 mattress
38 adjustable bed
40 enclosure
42 fold line
44 first portion
46 second portion
48 third portion
50 imaginary line
52 sheet
54 mattress
56 pillow
58 top end
60 top strap
62 lower end
64 lower strap
66 seam area
67 slits
68 seam area
69 slits
70 cut 72 cut
74 cut
76 cut
77 fold lines
78 area of top fold
79 fold lines
80 area of top fold
82 seam
84 seam
86 area of side fold
88 area of side fold
90 seam
92 seam
94 straps inserted through slits

DETAILED DESCRIPTION OF THE PREFERRED EMBODIMENT

The following discussion describes in detail at least one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1-9 illustrate the present invention wherein a pillow holder is disclosed for use on an adjustable bed.

Turning to FIG. 1, therein is shown the present invention which is comprised of a single sheet of material 12 being substantially rectangular shaped having a first upper end 14 and a second lower end 16 along with a first side 18 and a second side 20 having an upper surface 22 and a lower surface 24. The lower end 16 is folded back upon itself toward end 14 so that the upper surfaces of the folded section are contiguous to each other so as to form an enclosure 40 having a pillow 26 disposed therein. Mating hook and loop material 28 is placed on the first and second sides of the sheet of material 12 so that when the end 16 is folded back upon itself the mating hook and loop material removably mates about intermediate between ends 14, 16 so as to attach the end 16 to the sheet of the material thereby forming an enclosure within which to hold a pillow 26. Also shown are a pair of laterally extending straps 30 attached to the upper end 14 of the sheet of material 12 which straps are placed about the head of the adjustable bed so as to attach the piece of material 12 to the head of the bed.

Figure 2:
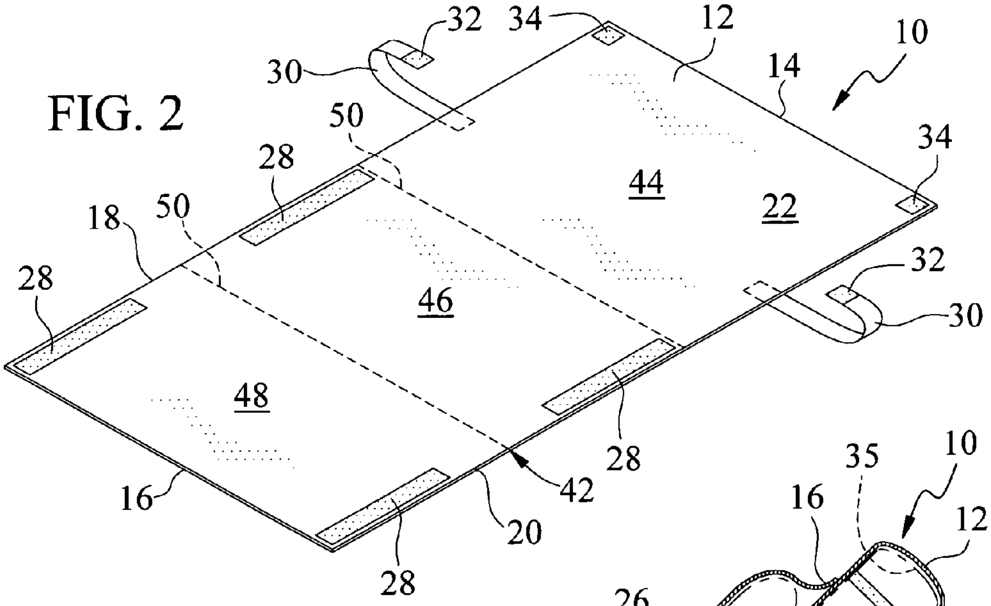
FIG. 2 is a perspective view of one embodiment of the present invention in an unfolded position.

Turning to FIG. 2, therein is shown the piece of material 12 having upper and lower ends 14, 16 and first and second sides 18 and 20 showing the upper surface 22 having the mating hook and loop material 28 disposed thereon along with straps 30 on sides 18, 20 wherein each strap has is a piece of hook and loop material 32 placed on its end so that it can removably join with mating hook and loop material 34 shown on the upper corners of the piece of material 12. A fold line 42 shows the approximate location where end 16 folds back toward the opposite end 14 so that fold line 42 is disposed about ¼ to ⅓ of the distance between ends 14, 16 measured from end 16. Sheet 12 has first 44, second 46, and third 48 substantially rectangular portions as numbered from first end 14 of the sheet, wherein the first, second, and third portions are separated by an imaginary line 50 running transversely across the sheet from the first side 18 to the second side 20 of the sheet, wherein an enclosure 40 (see FIG. 3) is formed for receiving the pillow therein when the third portion is folded back upon the second portion, the enclosure having upper and lower surfaces each having an inner surface, wherein the inner surfaces are disposed contiguous to each other Turning to FIG. 3, therein is shown the present invention 10 being disposed on the upper end 35 of the mattress 36 which is placed on the upper end of an adjustable bed 38 wherein the mattress is shown in the raised position on the bed. Shown therein is pillow 26 being housed inside the enclosure 40 the sheet of material 12 having the lower end 16 being folded back upon itself. Also shown is strap 30. The upper end 14 of sheet 12 wraps around the upper end 35 of mattress 36 so as to encompass a portion of the mattress in order to removably join the present invention 10 to the mattress.

Figure 3:
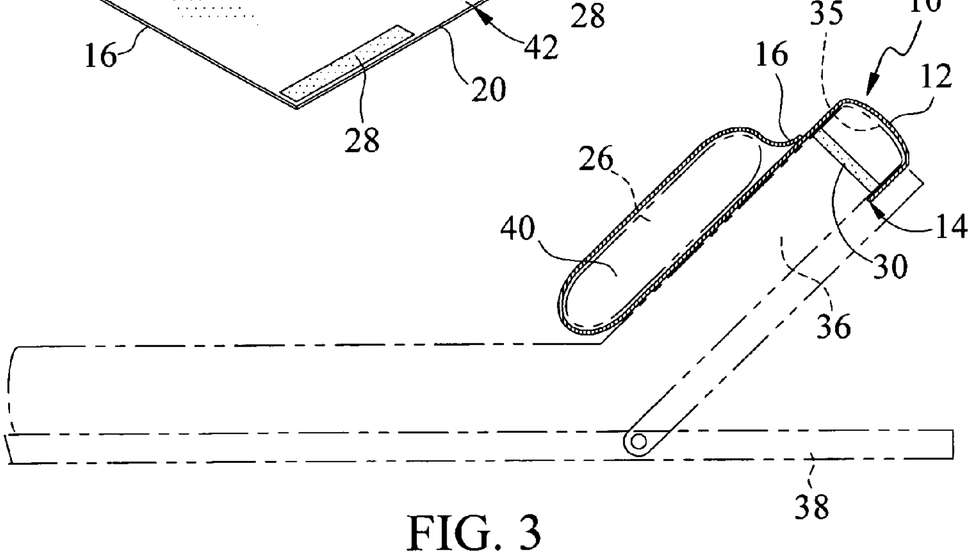
FIG. 3 is a side view of one embodiment of the present invention in operative connection to the head of a bed.

The steps of the method for using the present invention as shown in FIGS. 1-3 follow: a) providing a substantially rectangular sheet of material 12 having first and second opposing ends 14,16, first and second opposing sides 18,20, and upper and lower surfaces 22,24; b) folding the second end of the sheet back toward the first end of the sheet so that an enclosure 40 is formed thereinbetween for removably receiving the pillow 26 therein, the enclosure having upper and lower surfaces each having an inner surface disposed contiguous to each other; c) providing first mating hook and loop material 28 on the first and second sides of the inner surfaces of the upper and lower surfaces of the enclosure for removably joining the sides of the enclosure so that the pillow can be removably disposed in the enclosure; d) placing the pillow inside the enclosure and joining the sides of the enclosure; e) providing first and second straps 30 extending laterally from the first and second sides of the sheet, each strap having an end thereon, each end having a second piece of hook and loop material 32 thereon; f) wrapping the first end of the sheet around the upper end 35 of the mattress so as to encompass part of the mattress so that the first and second straps are disposed proximate to the first end of the sheet; and, g) providing a third piece of hook and loop material 34 on each corner of the upper surface of the first end of the sheet so that when the first end of the sheet is wrapped around the upper end of the mattress the second and third pieces of hook and loop material mate to each other and the first and second straps are disposed over the sides of the mattress so as to removably secure the sheet to the mattress. It can be seen that the present invention 10 provides a pillow holder designed for adjustable beds 38 which keeps the pillow 26 from slipping down from the head 35 of the bed when the head of the bed is raised. Also, the present invention 10 provides a pillow holder which can be easily and simply cleaned and maintained in a sterile condition suitable for use in a hospital environment being made of flexible fabric or material as would be done in the standard manner by one skilled in the art.

Figure 4:
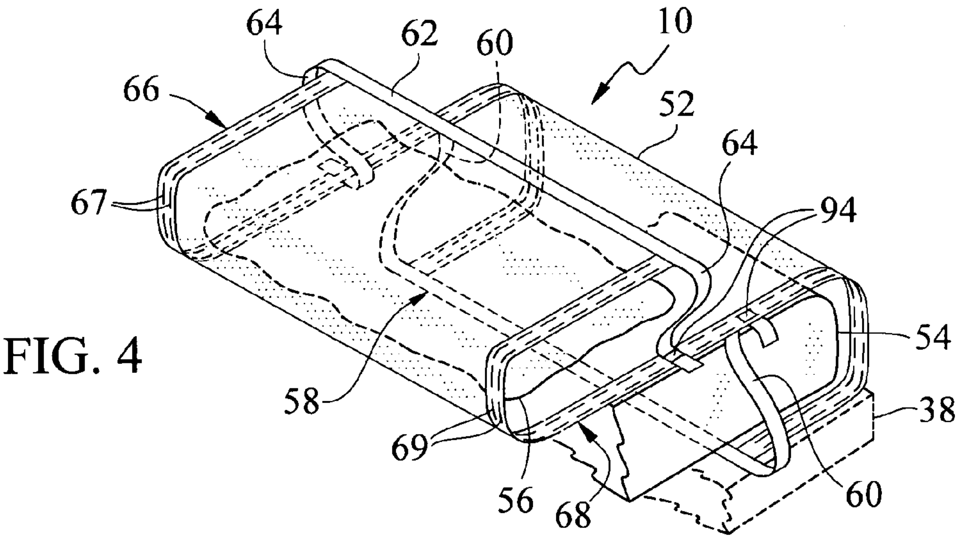
FIG. 4 is a perspective view of one embodiment of the present invention in operative connection to the head of a bed.

Turning to FIG. 4, therein is shown the preferred embodiment of the present invention 10 comprising a sheet of material 52 having a top end 58, and a top strap 60 disposed on each side thereof along top end 58 and with the mattress 54; also shown is the bottom or lower end 62 of the sheet along with a bottom or lower strap 64 on each side and also disclosing a pillow 56 therein. Top strap 60 is disposed on and extends along the top end 58 of the sheet 52 so that the top strap and the top end appear to be coincident in FIG. 4. Top end 58 shown in FIG. 4 is equivalent to upper end 14 shown in FIG. 3. Also shown is a seam area 66 with double slits 67 (i.e., two parallel rows of single slits) on one side of the sheet 52 and another seam area 68 with double slits 69 on the opposite side of the sheet 52. It can be seen that the ends of the straps 60, 64 can be inserted as shown at 94 through each of the slit areas in order to connect the straps to the sheet 52. Bed frame 38 is also shown. Note the "S" shape of the edge of sheet 52 as would be observed when viewed from a right elevation view.

The top end 58 of the sheet 52 is inserted between the mattress 54 and the adjustable bed frame 38. The two top straps 60 are inserted into the slits 67, 69 of slit area 66, 68 on the upper side of the upper end of the mattress by being inserted through the innermost slit and looped back down and then out of the adjacent outermost slit and drawn tight to secure the present invention 10 to the upper end of the mattress as shown by example at 94. If desired, the strap 60 may again be looped through the slits 67, 69 above or below the previous insertion point to further secure the present invention 10. Note that since there are double slits 67, 69 running from top 58 to bottom 62 of the present invention 10 that this allows for height adjustment of the present invention on the mattress 54 of the bed 38. In order to insert a pillow 56 the bottom end 62 of the present invention 10 is raised upward and toward the top end of the mattress so as to form an enclosure wherein the pillow is inserted into the enclosure similarly as described relative to FIG. 1. The two bottom straps 64 is now inserted into the slits 67, 69 of slit area 66, 68 on the upper side of the mattress by being inserted through the innermost slit and looped back down and then drawn out of the outermost slit and pulled tight to secure a pillow 56 within the device 10 as shown by example at 94. This may be repeated if desired in the adjacent slits above and below the original insertion point to keep the pillow 56 in place. Again, since the double slits 67, 69 run up and down the entire length of the present invention 10 this allows for adjustment of the pillow 56 of the present invention for enclosure size, height/length relative to the mattress and comfort of the user.

Figure 5:
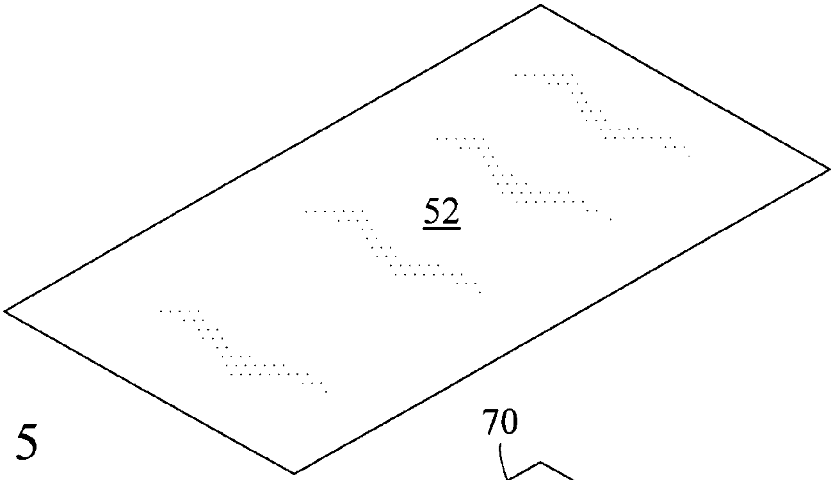
FIGS. 5-9 are perspective views of portions of the present invention.

Turning to FIG. 5, therein is shown step one of a method of making the preferred embodiment of the present invention by initially providing a flexible sheet 52 of medical grade TYVEK, or the like, of suitable material being approximately 60" to 72" wide suitable for a twin-size, adjustable bed and possibly wider for other sizes as might be used in a hospital or similar institution.

Figure 6:
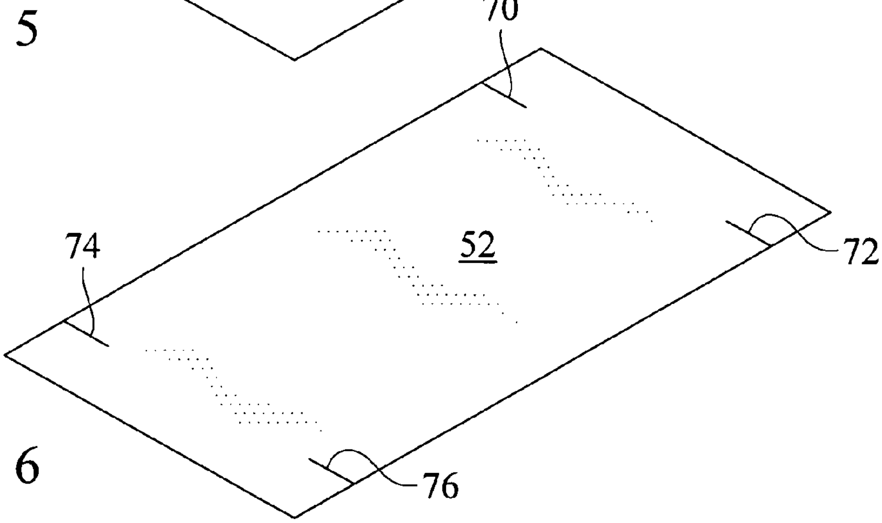

Turning to FIG. 6, therein is shown step two of making the preferred embodiment of the present invention using the sheet 52 and making cuts 70, 72, 74, 76 toward the sheet center near each corner of and completely through the sheet of material. Each cut 70-76 is disposed an effective distance from each end and having an effective length so that straps can be formed at each corner of the sheet in a later step.

Figure 7:
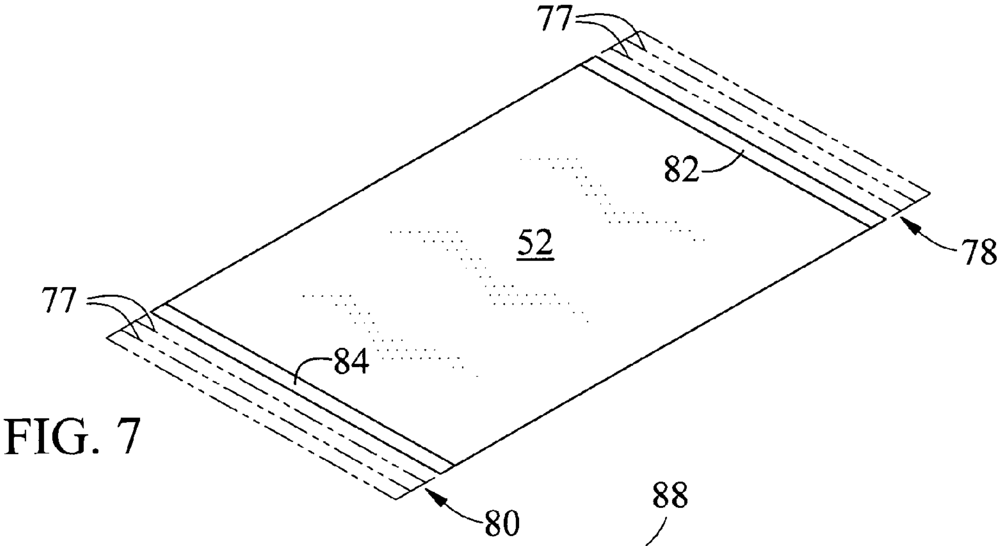

Turning to FIG. 7, therein is shown step three of making the preferred embodiment of the present invention using sheet 52 wherein the top and bottom end is folded as shown at 78, 80 toward the center of sheet 52 and then a seam 82, 84 are formed from the folded material at the top and bottom ends of the sheet so that the heat pressed seam 82, 84 is formed during the manufacturing process. Heat pressed seams 82, 84 will become top end 58 and lower end 62 of the present invention 10 as shown in FIG. 4. The fold lines 77 are shown as phantom lines.

Figure 8:
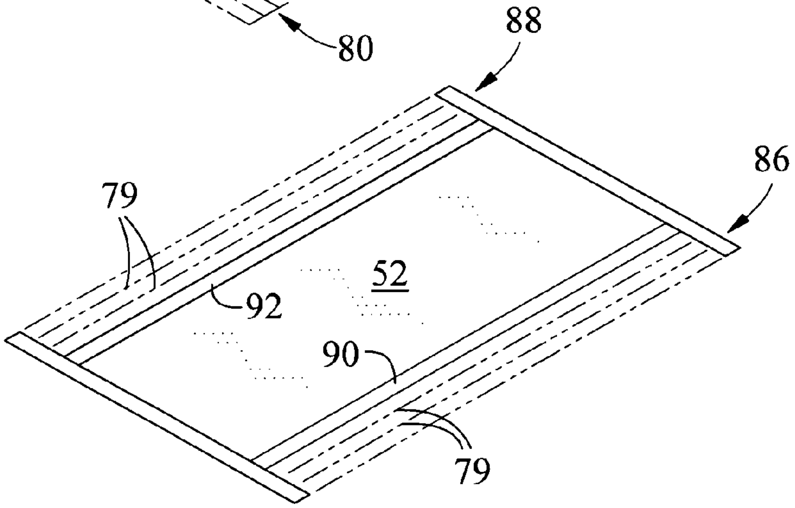

Turning to FIG. 8, therein is shown step four of making the preferred embodiment of the present invention wherein a second side fold area 86 and fold area 88 are folded inwardly to form a first side seam 90 and a second side seam 92 on the opposite side of the sheet 52 being again formed by heat pressing the material so as to form the seams 90, 92. The fold lines 79 are shown as phantom lines.

Figure 9:
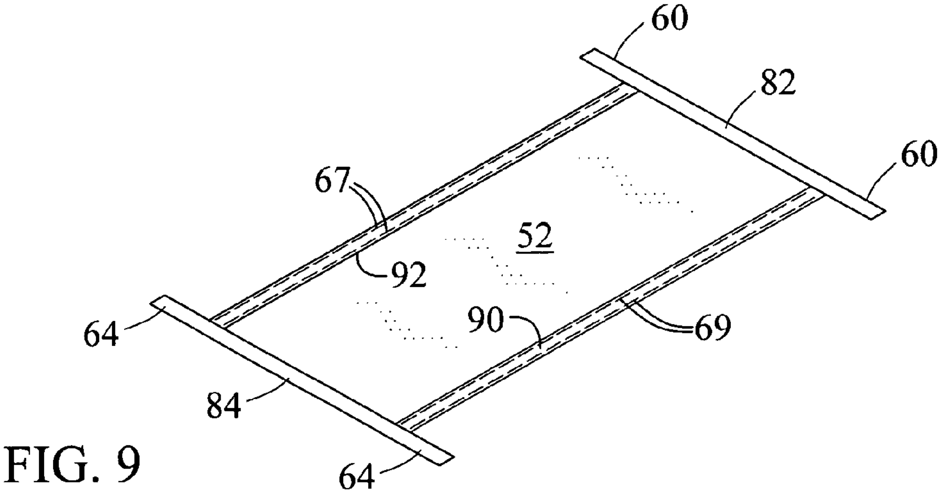

Turning to FIG. 9, therein is shown step five of the manufacturing process of making the preferred embodiment of the present invention wherein the line of parallel slits 67, 69 is cut on the left and the right side of sheet 52 in the seams 90, 92 and leaving exposed the top strap 60 and the lower strap 64 for connection as previously disclosed herein in FIG. 4.

I claim:

1. A pillow holder for use with a mattress and a pillow, the mattress having an upper end, comprising:

a) a sheet of material having first and second opposing ends, first and second opposing sides, and upper and lower surfaces, said sheet being substantially rectangular;

b) a fold line extending transversely across said sheet from said first side to said second side of said sheet, said fold line being disposed about ⅓ of the distance from said second end to said first end as measured from said second end, wherein said fold line is formed when said second end of said sheet is folded back toward said first end of said sheet so that an enclosure is formed for removably receiving the pillow therein, said enclosure having and upper and lower facing surfaces;

c) strips of mating hook and loop material being disposed on each said first and second side of said inner surface of said upper and lower facing surfaces of said enclosure for removably joining said sides of said enclosure so that the pillow can be removably disposed in said enclosure, said strips on both said facing surfaces terminating at one end of said strips adjacent said second end of said sheet when folded so that said second end of said sheet substantially closes off an open end of said enclosure with said pillow enclosed without use of closure material along said second end of said sheet and between said strips;

d) first and second straps extending laterally from said first and second sides of said sheet not directly attached to said enclosure, each said strap having an end thereon, each said end having a piece of hook and loop material thereon, said first and second straps being disposed adjacent said first end of said sheet so that when said first end of said sheet wraps around the upper end of the mattress so as to encompass part of the mattress, said first and second straps are disposed proximate to said first end of said sheet; and, e) a piece of hook and loop material being disposed on each corner of said upper surface of said first end of said sheet so that when said first end of said sheet wraps around the upper end of the mattress so as to encompass part of the mattress said pieces of hook and loop material on said straps and said sheet mate to each other and said first and second straps are disposed over the sides of the mattress so as to removably secure said sheet to the mattress.

2. The pillow holder of claim 1, wherein said fold line is disposed about ¼ of the distance from said second end to said first end of said sheet as measured from said second end.

3. A pillow holder for use with and in combination with a folding mattress and folding bed comprising:

a) said bed folding upwardly at one end thereof;

b) said mattress on said bed being foldable along with said bed;

c) a sheet of material having first and second opposing ends, first and second opposing sides, and upper and lower surfaces, said sheet being substantially rectangular for covering a portion of an upper side of said mattress;

d) a fold line extending transversely across said sheet from said first side to said second side of said sheet, wherein said fold line is formed when said second end of said sheet is folded back toward said first end of said sheet so that an enclosure is formed for removably receiving the pillow therein, said enclosure having upper and lower facing surfaces;

e) strips of mating hook and loop material being disposed only on each said first and second side of said inner surface of said upper and lower inner surfaces of said enclosure for removably joining only sides of said enclosure to that the pillow can be removably disposed in said enclosure;

f) first and second straps extending laterally from said first and second sides of said sheet, each said strap having an end thereon, each said end having a piece of hook and loop material thereon, said first and second straps being disposed adjacent said first end of said sheet separated from and not directly attached to said enclosure;

g) a piece of mating hook and loop material being disposed on each corner of said upper surface of said first end of said sheet; and h) said first end of said sheet being wrapped about an upper end of said mattress, said pieces of hook and loop material on said straps and said sheet mating with each other, and said first and second straps disposed over the sides of the mattress between said enclosure and said upper end of said mattress.

4. The combination of claim 3 wherein said strips on both said inner upper and lower surfaces terminate at one end adjacent said second end of said sheet so shat said second end of said sheet substantially closes off an open end of said enclosure with said pillow enclosed.

5. The combination of claim 3 in which said fold line of said sheet lies adjacent folding lines of said bed and mattress.

* * * * *